United States Patent [19]

Müller et al.

[11] 4,224,971
[45] Sep. 30, 1980

[54] DOWEL OR ANCHORING MEANS

[76] Inventors: Dieter Müller, Berger Str. 3a, 8136 Percha; Wilhelm Endlich, Mimosenstr. 7, 8 München 45; Siegfried Kugler, Haus Nr. 12, 8041 Fahrenzhausen, all of Fed. Rep. of Germany

[21] Appl. No.: 903,095

[22] Filed: May 5, 1978

Related U.S. Application Data

[60] Division of Ser. No. 736,152, Oct. 27, 1978, Pat. No. 4,100,954, which is a continuation of Ser. No. 583,000, Jun. 2, 1975, abandoned, which is a continuation of Ser. No. 205,158, Dec. 6, 1971, abandoned.

[30] Foreign Application Priority Data

Dec. 4, 1970 [DE] Fed. Rep. of Germany ....... 2059852

[51] Int. Cl.² ............................................ F16B 13/00
[52] U.S. Cl. ................................ 151/41.7; 85/63; 156/71; 156/91; 156/305; 405/261
[58] Field of Search ................ 85/63, 64; 151/41.7, 151/14.5; 405/260, 261; 156/91, 92, 71, 305; 428/307, 377; 52/698, 705

[56] References Cited

U.S. PATENT DOCUMENTS

| | | | |
|---|---|---|---|
| 1,516,652 | 11/1924 | Tomkinson | 85/63 |
| 1,817,790 | 8/1931 | Whiffen | 428/377 |
| 2,078,473 | 4/1937 | Truemper | 85/63 |
| 2,154,355 | 4/1939 | Rawlings | 156/92 |
| 3,188,815 | 6/1965 | Schuermann et al. | 85/63 |
| 3,396,116 | 8/1968 | Adams et al. | 151/14.5 |
| 3,430,449 | 3/1969 | Novotny et al. | 85/63 X |
| 3,521,454 | 7/1970 | Dodds | 85/63 X |
| 3,642,937 | 2/1972 | Deckert et al. | 151/14.5 X |
| 3,723,215 | 3/1973 | Kessler | 156/92 |
| 3,993,822 | 11/1976 | Knauf et al. | 156/71 X |

FOREIGN PATENT DOCUMENTS

| | | | |
|---|---|---|---|
| 357164 | 8/1922 | Fed. Rep. of Germany | 85/63 |
| 1293620 | 10/1972 | United Kingdom | 405/261 |

*Primary Examiner*—Rodney H. Bonck
*Attorney, Agent, or Firm*—Michael J. Striker

[57] ABSTRACT

This invention relates to an anchoring arrangement comprising a plug of a two-component adhesive adapted to be received in a hole in a receiving material, said adhesive being hardenable after the intermixing of the two components and at least one component thereof being micro-encapsulated and in intimate mixture with the second component, and an anchoring rod for an arrangement rupturing said micro-capsules upon insertion into said hole.

3 Claims, 10 Drawing Figures

DOWEL OR ANCHORING MEANS

This is a division of application Ser. No. 736,152, filed Oct. 27, 1978, and now U.S. Pat. No. 4,100,954, which is a continuation of application Ser. No. 583,000 filed June 2, 1975, now abandoned, which in turn is a continuation application of application Ser. No. 205,158, filed Dec. 6, 1971, now likewise abandoned.

The present invention relates to a dowel or anchoring means with a two-component adhesive which hardens after the mixing of the components and serves for the purpose of anchorage in the receiving material. Straddling dowels are frequently used at the present time for anchorage in brickwork, in concrete and similar foundations. Such straddling dowels are unsuitable, however, as reinforcements for many uses thereof. For example, in the case of reinforcements on corners of brickwork by means of straddling dowels, there arises the danger that masonry will chip off because of the straddling forces. Light-weight building materials are being employed to an increasing extent in the building arts, such as for example gas concrete, aeroconcrete, Ytong building blocks (building blocks or bricks from slag or clinker material), and similar soft materials. The high straddling forces arising in the case of straddling dowels exceed the mechanical or structural resistance of such materials, and the result thus will be a loosening and breaking away of the anchoring means, or other damage. In addition, the torsional stability of the known dowels in the materials mentioned hereinabove is often insufficient.

Already known in the art is an adhesive dowel with the aid of which the disadvantages outlined above are intended to be obviated. This adhesive dowel has a two-component adhesive. Each component of this adhesive is enclosed within a glass container. One glass container encloses the other glass container. This prior art adhesive dowel is mounted or put in place as follows: A hole is drilled initially in the foundation. The small glass tube is then inserted into the hole. Thereafter the dowel or an anchoring means is driven into the borehole by means of a percussion drill. At that time the glass containers are destroyed and the adhesive components, being released as a result, are intermixed. The two components of the adhesive react with each other, and the adhesive hardens fully.

This prior art adhesive dowel has numerous disadvantages and drawbacks, namely:

It requires two small glass tubes which are provided within each other in each case and each of which is filled with one component of the adhesive. The expenditure involved in making these glass tubes is relatively high. The small glass tubes break easily, which is a distinct disadvantage particularly in the building industry. The glass fragments of an unintentionally broken glass tube bring about the danger of injuries, and the adhesive which runs out may cause ugly soiling. Moreover, skin cauterizations may be the result when operators come into contact with the running adhesive.

In order to make a good adhesive effect possible, the two components of the adhesive must be well intermixed while the dowel or anchoring means is inserted. A sufficiently good and uniform mixing upon which the correct hardening of the adhesive depends is not always assured in the prior art adhesive dowel.

It is the object of the present invention to eliminate the disadvantages and drawbacks of the prior art devices.

In a device of the type referred to hereinabove, this object is obtained—in accordance with the present invention—by virtue of the fact that at least one adhesive component is micro-encapsulated, and that the micro-capsules are in an intimate mixture with the second component.

The present invention makes use of the micro-encapsulation technique. This is a new physico-chemical process for enclosing very small amounts of liquids and solid materials, for example by preserving. The walls of the capsule can be destroyed by mechanical influence, for example by pressure, whereupon the content of the capsules will be released. The fact that at least one component of a two-component adhesive is micro-encapsulated assures that no reaction with the likewise present second component will take place even though both of the components—separated from each other only by the capsule walls—are well intermixed. As a result, the adhesive being prepared for the reaction can be stored for almost an indefinite period of time. Only after the capsule walls have been destroyed will the two adhesive components come into contact with each other; a reactive mixture of the two adhesive components is produced, and the adhesive will harden fully.

The present invention affords numerous advantages. The adhesive which is prepared for the reaction is present in dry form. No glass tubes such as those referred to above in connection with the prior art adhesive dowel are required, and the problems pertaining to the latter are accordingly eliminated. A good hardening of the adhesive once the capsule walls have been broken open is effectively assured by virtue of the fact that the two components in the non-reactive condition thereof are separated from each other only by the capsule walls and yet are mixed well with each other. If some capsules should be destroyed, due to improper handling, before the time for the application thereof, the only result can be a reaction of the polymer material having been liberated. The function of the dowel, however, is not impaired thereby because during the application, the remaining capsules will react after having been broken open. While the prior art adhesive dowel described above can be practically made only in greater dimensions, the dowel or anchoring means proposed by the present invention also may be made very small.

A two-component adhesive according to the present invention may have, for example, as a first component a slowly reactive, medium-reactive or highly reactive unsaturated polyester resin with an accelerator, for example diethyl aniline, and, as a second component an organic peroxide in either solid or liquid form. If one component is present in solid form, it can be diluted in a suitable solvent, for example phthalate, for purposes of encapsulation.

The micro-capsules are advantageously linked with each other by means of a binding agent. It is possible to connect the micro-capsules in the same manner also with a further part of the dowel or anchoring means. It is possible to use as a binding agent, for example, alkydresins, vinyl compounds, acrylic resins, latex compounds, gelatin, and similar substances.

A liquid component of the adhesive is advantageously micro-encapsulated. The other component can in that case be a powder which adheres to the microcapsules on the outside thereof. Thus, each individual capsule represents a complete adhesive system.

According to another embodiment of the present invention, both components of the adhesive are micro-encapsulated. Achieved as a result is an even higher guarantee against undesired, premature reactions of the two components with each other.

In the dowel or anchoring means according to the present invention, only a limited space is available for the adhesive. The adhesive effect, however, improves progressively the more adhesive is accommodated within this space. It is therefore desirable to achieve as high a bulk weight as possible per unit of volume. It has been found in this connection to be advantageous not to use micro-capsules having a uniform diameter, but rather capsules with different diameters, so that the diameter thereof is within a specific spectrum. A diameter spectrum of the micro-capsules of between 300 and 1200 microns has been found to be particularly advantageous.

The expenditures for the dowel or anchoring means according to the present invention can be further reduced by adding, if desired, a filler agent to the adhesive substance. This addition can be so made that the filler is disposed either within the capsules or outside of them. Quartz sand or quartz powder with varying fine grain sizes are particularly favorable fillers. Other fillers, however, also may be used instead.

It may be advantageous to provide the micro-encapsulated two-component adhesive as a body separate from other parts—if they exist—of the dowel or anchoring means according to the present invention. In that case the adhesive, at least one component of which is micro-encapsulated, is suitably made according to the extrusion process in the form of, for example, a cylindrical strand or a cylindrical tube. In order to obtain an anchoring effect, such an adhesive body, for example, may be inserted in a mounting hole having the same diameter as that of the adhesive body. Inserted into the adhesive body thereafter, for example, is an anchoring means having a conical tip and whose diameter is smaller than the outside diameter of the adhesive body. When the anchoring means is inserted into the adhesive body, the walls of the micro-capsules are destroyed and the adhesive hardens. The two-component adhesive, at least one component of which is micro-encapsulated, of course also can be extruded directly into the borehole. The adhesive body also may be enclosed with a porous sheathing, for example a gauze, in order to protect the outwardly positioned micro-capsules against mechanical damage and for the purpose of achieving a mechanical reinforcement and stabilization. It is advantageous to extrude the micro-encapsulated two-component adhesive, which is made into a paste with a suitable readily volatile liquid and, if desired, a thixotropic agent, directly into a prepared mounting hole in a mounting foundation, for example, by means of a hand-operated instrument. The extruded capsule paste solidifies once the pasting liquid has volatilized, and it is then possible to screw thereinto, for example, a fastening screw whereby the walls of the micro-capsules are destroyed and after which the adhesive hardens.

The adhesive advantageously may be connected with flexible porous carrier substances. This assures a particularly firm and rigid adhesive body to which a filler, namely the carrier substance, is added at the same time. The carrier substance must be porous so that the components of the adhesive are adapted, after destruction of the micro-capsules, to easily penetrate therethrough and establish a connection not only with the wall of the mounting hole but also with the anchoring device. The micro-capsules are protected particularly effectively against undesirable mechanical stresses when they are arranged between the layers of a cylinder from two layers of a flat carrier substance.

Preferred as a carrier substance is a fibrous mixture, a fleece, or a gauze material made from glass fibers. Other carrier substances, such as paper, for example, or also other tissues or fleeces from other fibers may be equally employed.

The carrier substance is advantageously a flat structure which is coated at least on one side thereof with the two-component adhesive and rolled in several layers to form a cylinder or a hollow cylinder. Such a dowel, which must be made in a suitable length, can be used directly, and without requiring further parts, for anchoring purposes together with ordinary wood screws or self-tapping screws, in the manner of the known plastic straddling dowels. In order to make an anchoring with this type of dowel, a mounting hole is drilled into the receiving material which hole has approximately the dowel diameter and into which the dowel of the construction or configuration described herein is inserted. To obtain the anchorage or fastening, an ordinary wood screw is then screwed into the dowel. Due to the forces arising at the time of the threading action, the walls of the micro-capsules are destroyed and the two-component adhesive hardens. A dowel of the construction referred to hereinabove last is made, for example, in that strips of supporting material being layered on one side thereof with the micro-encapsulated two-component adhesive and having a width equal to the desired dowel length are wound on to mandrels until the desired dowel diameter has been achieved. Wider sheets of supporting material also may be used, however, for the winding operation. In the latter case it is necessary to cut the rolled or wound body into suitable partial lengths. This type of dowel is thus particularly simple to make with little expenditure. Another advantage of the dowel having this particular construction is that, immediately after a screw has been provided therein, clamping forces exist which are not so significant as to be capable of damaging the receiving material while, however, being sufficient to initially assure a supporting effect which is very advantageous in actual practice. The nominal supporting power or carrying capacity of this dowel is thereafter obtained following the hardening of the two-component adhesive.

Advantageously, at least one supporting element of the dowel or anchoring means is provided with the two-component adhesive, and the walls of the microcapsules can be destroyed by connecting a mounting element with the first element. Mounting elements which can be connected with the supporting element must carry the adhesive body at a point on which it is mechanically stressed until is is destroyed, during the attachment of the mounting element to the supporting element.

According to another embodiment of the present invention, the supporting element is a hollow cylinder which is closed at one end thereof and in which the two-component adhesive is disposed; the wall of this hollow cylinder comprises numerous radially-extending perforations and a mounting element is adapted to be driven into the open end of the cylinder. When the mounting element is driven thereinto, the micro-capsules are partially destroyed due to the pressure arising at the time of such driving, and partially also at the time of passage through the narrow perforations in the cylinder wall. These perforations of course must be made so small that the destruction of all the micro-capsules is assured.

When a screw is intended to be connected with the supporting element, the anchoring element is equipped at the open end thereof with an internal thread.

According to yet another embodiment of the present invention, the two-component adhesive is rigidly disposed on the outside of a supporting element, and the dowel or anchoring means comprises another sleeve or shell which can be slid over the supporting element with the ensuing destruction of the walls of the micro-capsules. One end face of the cylinder wall of the sleeve or shell is advantageously provided as a scraping cone for scraping the adhesive off of the supporting element during the destruction of the micro-capsule walls. There still will remain a sufficient amount of adhesive between the sleeve or shell and the supporting element to assure the connection between these two elements. In order that his connection becomes even stronger, the supporting element has a flange at the end face thereof with which it is initially inserted into the mounting hole. This flange transfers the extracting forces arising at the supporting element to the sleeve or shell being firmly cemented within the mounting hole.

The supporting element advantageously has a thread for a mounting element. If an internal thread is provided for, a screw bolt may be connected with the supporting element. If the supporting element is equipped with an external thread at a projecting part, a nut may be screwed thereupon.

According to a still further embodiment of the present invention, the supporting element is conically provided and carries the adhesive body on its conical exterior. For such a dowel or anchoring means it is necessary to drill a conical hole into the receiving material. The dowel or anchoring means is then either threaded or driven into this mounting hole, at which time the walls of the micro-capsules are destroyed and the adhesive hardens.

In order to enhance the adhesive connection with the fastening or mounting foundation, the outer surface of the supporting element may be uneven. It can be provided, for instance, with projections, a thread, or with grooves extending transversely to the longitudinal extension and direction of the supporting element.

The supporting element is suitably of metal. Other materials, however, such as, for example, plastic, or a combination of these materials, may be equally used therefor.

The present invention will now be further described hereinafter on the basis of several embodiments thereof and taken in connection with the accompanying drawings, wherein.

Figure 1:
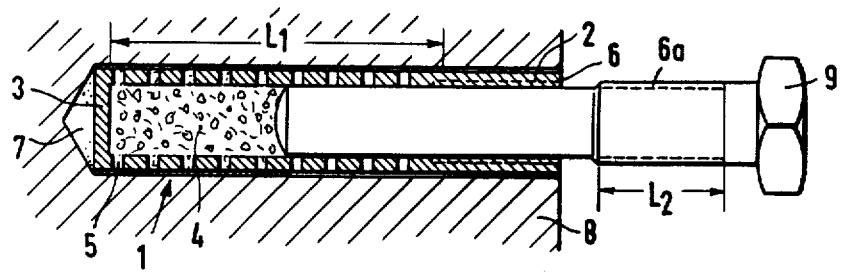
FIG. 1 illustrates an adhesive dowel for a fastening screw.

The dowel according to FIG. 1 which has been identified with reference numeral 1 in its entirety has a cylindrical sleeve or shell 2 as a supporting element. One end of the cylindrical sleeve or shell 2 is closed with an end face 3.

The inside of the cylindrical shell or sleeve 2 is filled over the length $L_1$ with a two-component adhesive 4 and both of the components of the latter are micro-encapsulated. Apertures 5 are present in the cylindrical wall of the cylindrical sleeve or shell 2. The latter has at its open end a screw thread 6. In order to mount the dowel 1, a mounting hole 7 is drilled into a receiving material 8, for example a brick wall. Thereafter the sleeve or shell 2 with the adhesive 4 is pushed or inserted into the fastening hole 7. Thereupon a fastening screw 9, which is provided with a screw thread 6a only at the rear portion of the shank thereof over a length $L_2$, is first inserted into the dowel 1 and then tightened therein. At that time the micro-encapsulated two-component adhesive 4 is compressed and forced through the apertures 5 in the wall of the cylindrical sleeve 2. As a result, the walls of the micro-capsules are ruptured and the two components of the adhesive react with each other, with the ensuing hardening of the adhesive.

Figure 2A:
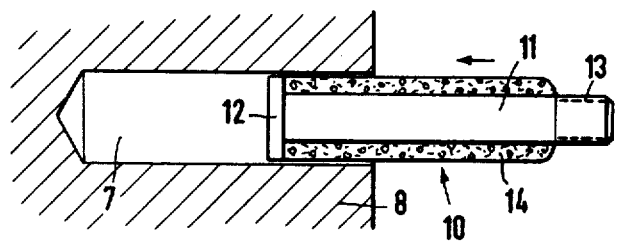
FIGS. 2a, 2b and 2c illustrate different steps in the assembly of another embodiment of an adhesive dowel upon which a nut may be threaded.
Figure 2B:
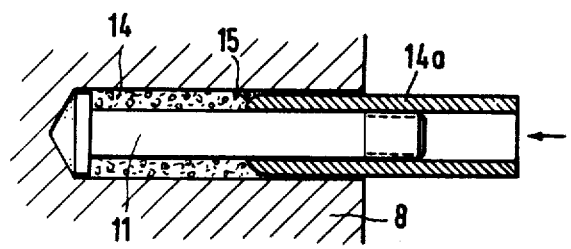
Figure 2C:
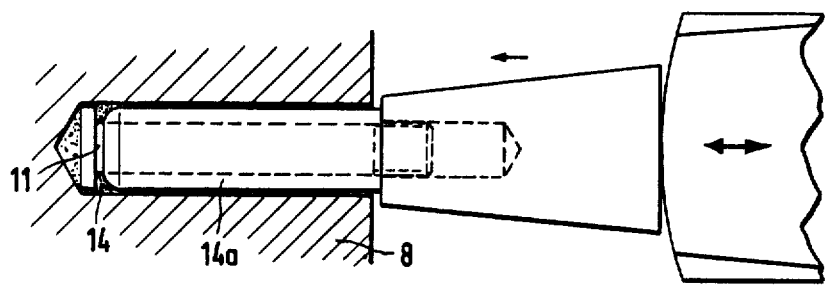

Reference is now had to FIGS. 2a to 2c. FIG. 2a shows an adhesive anchoring means or stay 10 which has a shank 11, the latter carrying a flange 12 at one end thereof. At the opposite end thereof the shank 11 has an external thread 13. The shank 11 is layered over the entire length thereof with the micro-encapsulated two-component adhesive 14. Further provided for the mounting of the adhesive anchoring means 10 is a cylindrical sleeve or shell 14a having the same length as the shank 11. At one end 15 thereof, the sleeve or shell 14a is conically tapered.

In order to mount the adhesive anchoring means or stay, a fastening hole 7 is here again first drilled into the receiving material 8. Then the adhesive anchoring means 10 together with the flange 12 at the head is inserted into the fastening hole. By way of the shank 11 the sleeve 14a with its conically tapered end 15 is next inserted. The last part of the way the sleeve 14a is driven in, as is apparent from FIG. 2c. When the sleeve 14a is slid in, the micro-encapsulated two-component adhesive 14 is at least partially pushed off of the shank 11 while the capsule walls are being ruptured, forced into the space between the fastening hole 7 and the outer wall of the sleeve 14a, and hardens. Thereafter, any desired part or element can be secured to the adhesive anchoring means 10 with the aid of a nut which is threaded on the external thread 13.

Figure 3:
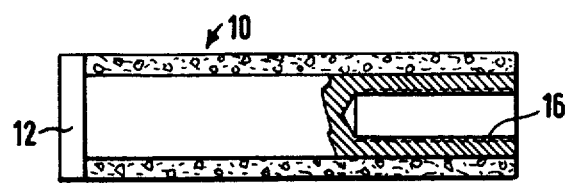
FIG. 3 illustrates the embodiment or construction of an adhesive dowel similar to that shown in FIGS. 2a through 2c, but which comprises an internal thread instead of a projection with an external thread.

FIG. 3 illustrates an adhesive anchoring means 10 which is similar to that shown in FIGS. 2a-2c, but which merely has an internal thread 16 instead of the external thread 13.

Figure 4:
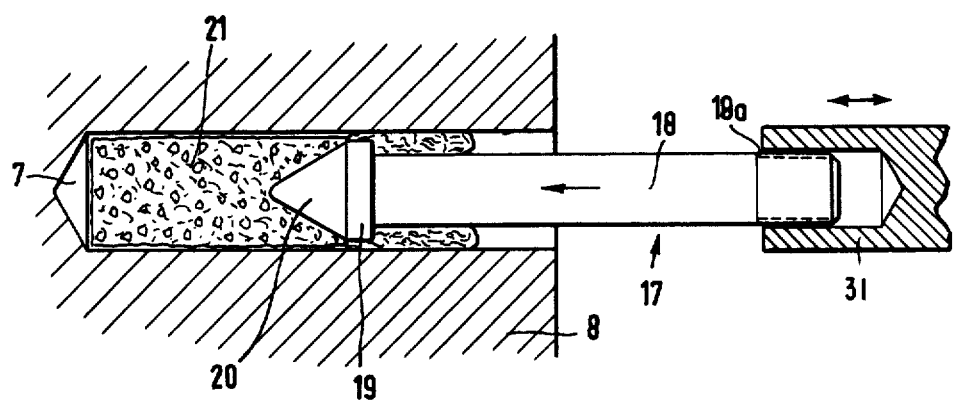
FIG. 4 illustrates an embodiment or construction for an adhesive anchoring means.

FIG. 4 illustrates a tie bar 17 with a shank 18 carrying a thread 18a. Disposed at one end of the shank 18 is a cylindrical part 19 having a greater diameter than that of the shank 18 which ends conically at the end 20 thereof facing away from the shank 18.

For purposes of connecting the tie rod 17 with a receiving material, an adhesive body 21 with micro-encapsulated two-component adhesive is provided.

To mount the tie rod 17, a fastening hole 7 is drilled into a receiving material 8. The adhesive body 21 is then inserted into this fastening hole 7. Inserted next into the hole is the tie rod 17 with its conical end 20 first. The diameter of the fastening hole is expediently chosen only slightly larger than the diameter of the cylindrical part 19 of the tie rod. When the tie rod 17 is inserted into the fastening hole 7, the walls of the micro-capsules are ruptured and forced through the interstice between the cylindrical part 19 and the wall of the borehole. The adhesive will then harden. The insertion of the tie rod 17 into the fastening hole 7 is effected expediently with the aid of a percussion drill whose percussion rotating attachment has been indicated at 31 and which is in operative engagement with the thread 18a at the shank 18.

Figure 5:
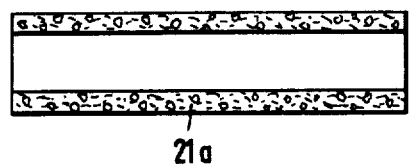
FIG. 5 illustrates a further embodiment or construction of an adhesive dowel which may be used either singly or in combination with the adhesive anchoring means according to FIG. 4.

FIG. 5 illustrates a further embodiment of the adhesive body 21 which, in this case, is provided as an extruded cylinder 21a. The adhesive components, at least one of which is micro-encapsulated, are connected with each other by means of binders and also may be provided with a filler.

With a suitable matching or coordination of the dimensions of the fastening or mounting hole within the receiving material of the adhesive body and of the fastening screw, such as an ordinary wood screw, the adhesive body 21a also may be directly used as the dowel. For that purpose it also may be provided as a hollow cylinder.

Figure 6:
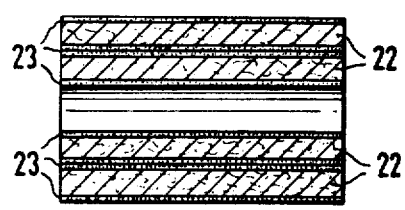
FIGS. 6 and 7 illustrates yet another embodiment or construction of a dowel as proposed by the present invention.
Figure 7:
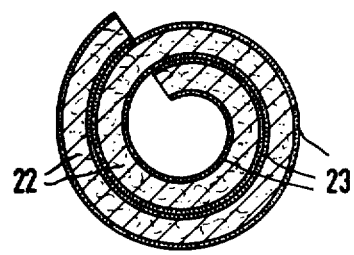
Figure 8:
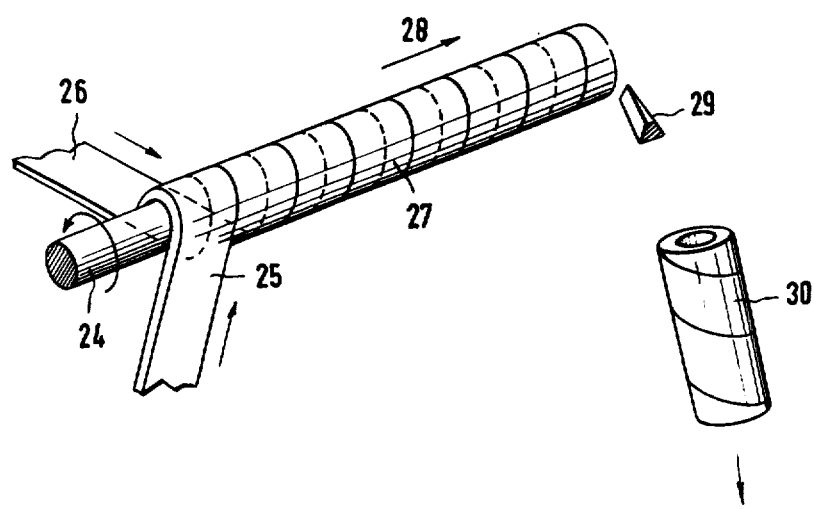
FIG. 8 illustrates schematically an apparatus for making a dowel as shown in FIGS. 6 and 7.

FIGS. 6 and 7 illustrate another embodiment of an adhesive dowel. This dowel consists of a band 22 from a flexible porous material, such as a glass fiber fleece, for example. The band 22 is coated on both sides thereof with a micro-encapsulated two-component adhesive 23, which will adhere thereto. The band 22 carrying the micro-encapsulated adhesive 23 is wound to form a hollow cylinder, such as is apparent from FIG. 7. The various layers of the hollow cylinder adhere to each other. This particular dowel then may be directly employed with fastening screws, for example with wood or with self-tapping screws, in the manner of conventional plastic straddling dowels. The thickness of the adhesive layer 23 is suitably selected. This dowel may be made approximately in the manner apparent from FIG. 8.

Two bands 25 and 26 which are coated on the upper side thereof with a micro-encapsulated two-component adhesive which adheres thereto are wound, in a superimposed manner with respect to each other, on a mandrel 24 which rotates in the direction of the arrow, so as to form a cylindrical tube 27. During the winding operation, the cylindrical tube is continuously advanced in the direction of the arrow 28. If a greater wall thickness of the tube is desired, more than two bands may be used for the winding operation.

The tube is cut into suitable sections 30 by a cutting device 29, and these sections then may be used as dowels.

It will be obvious to those skilled in the art that many modifications may be made within the scope of the present invention without departing from the spirit thereof, and the invention includes all such modifications.

What is claimed is:

1. An arrangement for anchoring objects to support structures, especially support structures of light-weight building materials, comprising an anchoring rod insertable with clearance into an anchoring hole in a support structure, said anchoring rod comprising an elongated stem and a flange of a diameter only slightly smaller than that of said anchoring hole at a leading end of said stem; and means for securing said anchoring rod in said anchoring hole consisting of a plug of a hardenable substance in said anchoring hole in the path of said anchoring rod and having two intermixed components at least one of which is encapsulated in microcapsules, so that the substance is squeezed by said anchoring rod during insertion thereof into said anchoring hole with concomitant rupturing of the microcapsules and resulting formation of an intimate mixture of said components which are displaced by said anchoring rod during advance thereof into the clearance between the anchoring rod and the anchoring hole to subsequently harden therein, said plug being a hollow cylindrical plug having an outer diameter substantially equal to that of said anchoring hole and an inner diameter smaller than that of said flange, said plug comprising a flexible porous carrier sheet coated at least on one side therof with said hardenable substance and wound in several layers to form said hollow cylinder, said anchoring rod being secured in said anchoring hole exclusively by said substance after the latter has hardened.

2. An arrangement as defined in claim 1, wherein said porous carrier sheet comprises a mixture of fibers.

3. An arrangement as defined in claim 2, wherein said fibers are glass fibers.

* * * * *